United States Patent
Golov

(10) Patent No.: US 11,891,054 B2
(45) Date of Patent: *Feb. 6, 2024

(54) VEHICLE NAVIGATION USING OBJECT DATA RECEIVED FROM OTHER VEHICLES

(71) Applicant: Micron Technology, Inc., Boise, ID (US)

(72) Inventor: Gil Golov, Backnang (DE)

(73) Assignee: Lodestar Licensing Group LLC, Evanston, IL (US)

( * ) Notice: Subject to any disclaimer, the term of this patent is extended or adjusted under 35 U.S.C. 154(b) by 418 days.

This patent is subject to a terminal disclaimer.

(21) Appl. No.: 17/063,860

(22) Filed: Oct. 6, 2020

(65) Prior Publication Data

US 2021/0016772 A1 Jan. 21, 2021

Related U.S. Application Data

(63) Continuation of application No. 16/010,997, filed on Jun. 18, 2018, now Pat. No. 10,807,592.

(51) Int. Cl.
| | |
|---|---|
| *B60W 30/09* | (2012.01) |
| *G06K 9/00* | (2022.01) |
| *G06V 20/58* | (2022.01) |
| *G06V 20/56* | (2022.01) |

(52) U.S. Cl.
CPC .............. *B60W 30/09* (2013.01); *G06V 20/58* (2022.01); *G06V 20/582* (2022.01); *G06V 20/584* (2022.01); *G06V 20/588* (2022.01); *B60W 2554/801* (2020.02); *B60W 2556/50* (2020.02); *B60W 2556/65* (2020.02)

(58) Field of Classification Search
CPC ........... B60W 30/09; B60W 2554/801; B60W 2556/50; B60W 2556/65; B60W 2552/53; B60W 2555/60; B60W 60/001; G06V 20/58; G06V 20/582; G06V 20/584; G06V 20/588; G06V 20/56

See application file for complete search history.

(56) References Cited

U.S. PATENT DOCUMENTS

| | | | |
|---|---|---|---|
| 9,816,827 B1 * | 11/2017 | Slusar | .................. B60W 30/18 |
| 10,769,953 B1 * | 9/2020 | Salles | .................. G05D 1/0287 |
| 10,807,592 B2 | 10/2020 | Golov | |
| 2018/0231387 A1 | 8/2018 | Thiel et al. | |
| 2019/0382004 A1 | 12/2019 | Golov | |

\* cited by examiner

*Primary Examiner* — Brian P Sweeney
(74) *Attorney, Agent, or Firm* — Greenberg Traurig

(57) ABSTRACT

A method includes: receiving, by a computing device, object data regarding a first object detected by a first vehicle, the object data including an object type and a location; storing the object data; generating, based on the object data, navigation data; and sending the navigation data to a second vehicle, the navigation data for use by the second vehicle to control navigation.

19 Claims, 12 Drawing Sheets

VEHICLE NAVIGATION USING OBJECT DATA RECEIVED FROM OTHER VEHICLES

RELATED APPLICATIONS

The present application is a continuation application of U.S. patent application Ser. No. 16/010,997, filed Jun. 18, 2018, issued as U.S. Pat. No. 10,807,592 on Oct. 20, 2020, and entitled "Vehicle Navigation Using Object Data Received from Other Vehicles," the entire disclosure of which is hereby incorporated herein by reference.

This application is related to U.S. Non-Provisional application Ser. No. 15/951,087, filed Apr. 11, 2018, issued as U.S. Pat. No. 10,997,429 on May 4, 2021, and entitled "Determining Autonomous Vehicle Status Based on Mapping of Crowdsourced Object Data," by Gil Golov, the entire contents of which application is incorporated by reference as if fully set forth herein.

This application is also related to U.S. Non-Provisional application Ser. No. 15/921,549, filed Mar. 14, 2018, issued as U.S. Pat. No. 10,894,545 on Jan. 19, 2021, and entitled "Configuration of a Vehicle Based on Collected User Data," by Robert Richard Noel Bielby, the entire contents of which application is incorporated by reference as if fully set forth herein.

FIELD OF THE TECHNOLOGY

At least some embodiments disclosed herein relate to controlling navigation of a vehicle in general, and more particularly, but not limited to, controlling navigation of a currently-moving vehicle based at least in part on object data received from one or more other vehicles.

BACKGROUND

A user of a vehicle can be a driver in the case of a manually-driven vehicle. In other cases, such as for an autonomous vehicle, the user of the vehicle typically performs fewer control actions than a "driver" as regards the operation of the vehicle. For example, in some cases, the user may simply select a destination to which the vehicle travels, but without performing any directional or other control of the immediate movement of the vehicle on the roadway.

Recent developments in the technological area of autonomous driving allow a computing system to operate, at least under some conditions, control elements of a vehicle without the assistance from a user of the vehicle. For example, sensors (e.g., cameras and radars) can be installed on a vehicle to detect the conditions of the surroundings of the vehicle on a roadway. One function of these sensors is to detect objects that are encountered during travel of the vehicle.

Autonomous vehicles use a variety of sensors and artificial intelligence algorithms to detect these objects and to analyze the changing environment around the vehicle during travel. Objects that are encountered may include, for example, traffic lights, road signs, road lanes, etc. Failing to detect certain of these objects could cause an unexpected or undesired behavior of the vehicle, and in some cases could expose passengers of the vehicle and/or others outside of the vehicle (e.g., in the immediate area surrounding the vehicle) to danger.

Also, the object detection range of the vehicle is limited by the capabilities of the vehicle's sensors. This detection range may be further limited by certain adverse road and/or other conditions surrounding the vehicle during travel (e.g., stormy weather).

During normal operation of a vehicle, various sensors are used to operate the vehicle. For example, a computing system installed on the vehicle analyzes the sensor inputs to identify the conditions and generate control signals or commands for the autonomous adjustments of the direction and/or speed of the vehicle, without any input from a human operator of the vehicle. Autonomous driving and/or advanced driver assistance system (ADAS) typically involves an artificial neural network (ANN) for the identification of events and/or objects that are captured in sensor inputs.

In general, an artificial neural network (ANN) uses a network of neurons to process inputs to the network and to generate outputs from the network. Each neuron m in the network receives a set of inputs $p_k$, where $k=1, 2, \ldots, n$. In general, some of the inputs to a neuron may be the outputs of certain neurons in the network; and some of the inputs to a neuron may be the inputs to the network as a whole. The input/output relations among the neurons in the network represent the neuron connectivity in the network.

Each neuron m has a bias $b_m$, an activation function $f_m$, and a set of synaptic weights $w_{mk}$ for its inputs $p_k$ respectively, where $k=1, 2, \ldots, n$. The activation function may be in the form of a step function, a linear function, a log-sigmoid function, etc. Different neurons in the network may have different activation functions.

Each neuron m generates a weighted sum $s_m$ of its inputs and its bias, where $s_m = b_m + w_{m1} \times p_1 + w_{m2} \times p_2 + \ldots + w_{mn} \times p_n$. The output $a_m$ of the neuron m is the activation function of the weighted sum, where $a_m = f_m(s_m)$.

The relations between the input(s) and the output(s) of an ANN in general are defined by an ANN model that includes the data representing the connectivity of the neurons in the network, as well as the bias $b_m$, activation function $f_m$, and synaptic weights $w_{mk}$ of each neuron m. Using a given ANN model, a computing device computes the output(s) of the network from a given set of inputs to the network.

For example, the inputs to an ANN network may be generated based on camera inputs; and the outputs from the ANN network may be the identification of an item, such as an event or an object.

For example, U.S. Pat. App. Pub. No. 2017/0293808, entitled "Vision-Based Rain Detection using Deep Learning", discloses a method of using a camera installed on a vehicle to determine, via an ANN model, whether the vehicle is in rain or no rain weather.

For example, U.S. Pat. App. Pub. No. 2017/0242436, entitled "Road Construction Detection Systems and Methods", discloses a method of detecting road construction using an ANN model.

For example, U.S. Pat. Nos. 9,672,734 and 9,245,188 discuss techniques for lane detection for human drivers and/or autonomous vehicle driving systems.

In general, an ANN may be trained using a supervised method where the synaptic weights are adjusted to minimize or reduce the error between known outputs resulted from respective inputs and computed outputs generated from applying the inputs to the ANN. Examples of supervised learning/training methods include reinforcement learning, and learning with error correction.

Alternatively or in combination, an ANN may be trained using an unsupervised method where the exact outputs resulted from a given set of inputs is not known a priori before the completion of the training. The ANN can be trained to classify an item into a plurality of categories, or data points into clusters.

Multiple training algorithms are typically employed for a sophisticated machine learning/training paradigm.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
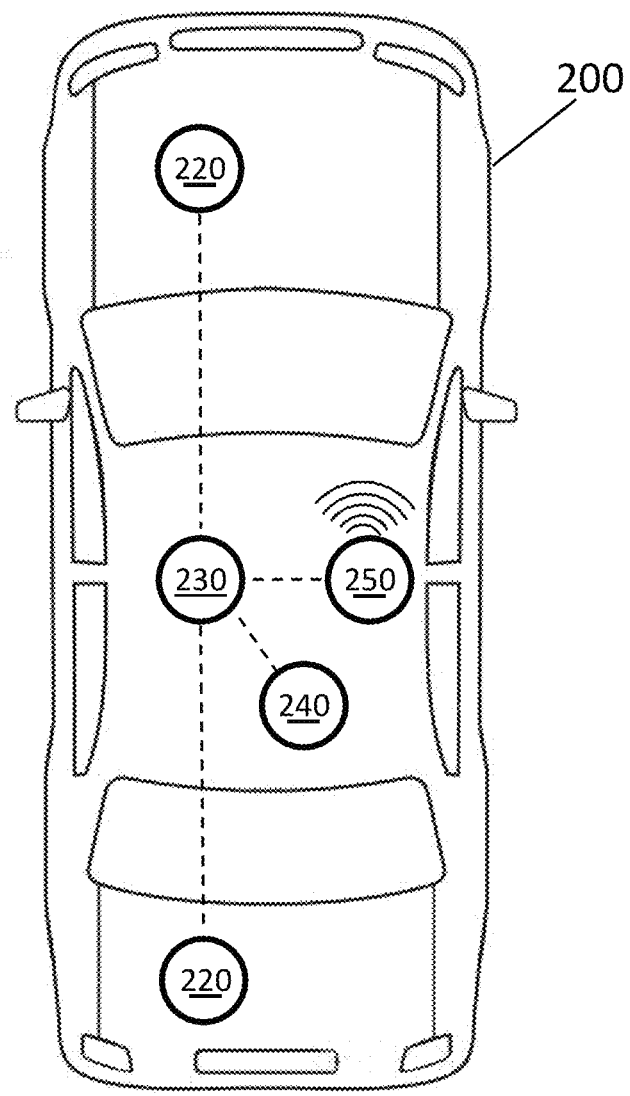
FIG. 1 illustrates a sensing system located on board a vehicle for collecting information concerning operation of the vehicle, according to one embodiment.

Currently, the technology supporting autonomous vehicles continues to improve. Improvements in digital camera technology, light detection and ranging (LIDAR), and other technologies have enabled vehicles to navigate roadways independent of drivers or with limited assistance from drivers. In some environments, such as factories, autonomous vehicles operate without any human intervention whatsoever.

While autonomous technology is primarily focused on controlling the movement of vehicles in a traditional sense, little emphasis has been placed on alternative applications that may be implemented on top of these autonomous systems. Indeed, application-level systems generally tend to reinforce existing uses of autonomous systems. For example, experimental uses of autonomous technology have been utilized to perform functions such as returning vehicles to a known location after delivering a passenger or performing refueling of vehicles while not utilized by passengers.

However, these approaches fail to fully utilize the hardware and processing power being implemented in autonomous vehicles. Thus, there currently exists a need in the state of the art of autonomous vehicles to provide additional services leveraging the existing hardware installed within such vehicles.

In particular, there is a need to solve the technical problem of improving the object detection range of a vehicle, such as an autonomous vehicle, during operation. In particular, this technical problem includes the need to detect physical objects that are outside of the sensor detection range of the vehicle. For example, there is a need to detect objects that are around sharp curves in the road ahead. This is needed to improve safety of navigation control of the moving vehicle.

At least some embodiments disclosed herein provide a technological solution to the above technical problem by receiving data regarding physical objects detected by one or more other vehicles (e.g., the hardware of these other vehicles is used to collect sensor data regarding objects encountered during travel). In some cases, for example, these other vehicles can be vehicles that have previously traveled over the same road that a current vehicle is presently traveling on (e.g., the other vehicles have detected a static object such as a traffic signal on the road prior to the current vehicle later arriving at the same location of the road).

As described in more detail below, in one embodiment, object data can be collected from one or more other vehicles travelling on the same road as the current vehicle being navigated. For example, the other vehicles can travel on the same road at the same time as the current vehicle, or at an earlier time.

In one example, the current vehicle controls navigation and/or other travel or vehicle operation in advance of arriving at a location at which dangerous objects are located, traffic is heavy, weather is inclement, etc. In one example, the current vehicle changes its navigation path or plan 100-1,000 meters in advance of arriving at a location on a road based on object data received from other vehicles that have collected data regarding objects using sensors. In one example, the current vehicle makes these changes 5-40 seconds in advance of arriving at the location on the road.

In other cases, for example, a current vehicle is navigating a road at the same time as other vehicles. The other vehicles are, for example, typically traveling ahead of the current vehicle (e.g., at an earlier time on the same road), but in some cases another vehicle could be behind, to the side, or at another orientation relative to the current vehicle. The current vehicle is, for example, a manually-driven vehicle or an autonomous vehicle (e.g., a car, truck, aircraft, drone, watercraft, etc.).

In one embodiment, other nearby vehicles exchange information in real time with the current vehicle being navigated. For example, vehicles that are within a predetermined distance of each other (e.g., less than 1,000 meters apart, or less than 50-350 meters apart) can exchange information regarding detected objects. More specifically, the exchanged information regards objects detected by the nearby vehicles. The information may be exchanged, for example, using short-distance radio transmissions, and/or communication with a cloud service accessible by the nearby vehicles and the current vehicle. In various embodiments, the object data received from the one or more other vehicles can be received directly from another vehicle and/or indirectly via a cloud service (e.g., a cloud used by all of the vehicles). By exchanging object data, the current vehicle is able to use the sensors of the other vehicles to aid in navigation, even if the other vehicles are located at a significant distance from the current vehicle (e.g., at a distance out-of-sight around a sharp curve, or behind a building, mountain, or other large object).

The object data received from the other vehicles increases the ability of the current vehicle to analyze the surrounding environment at an effectively increased distance. This allows the current vehicle to better navigate, especially in difficult travelling situations such as, for example, curves, mountainous areas, etc., and/or when traveling in difficult weather conditions (e.g., heavy rain or snow that affects visibility and sensor detection ranges). The foregoing improved effective object detection range increases the safety of operation of the current vehicle.

In one embodiment, the object data received by a car vehicle from another vehicle can include a location for each object detected and a type of object. In one embodiment, a computer model of the detecting vehicle can be used to provide at least a portion of the object data. For example, the computer model can classify the detected object and provide associated data such as the type of object, etc.

In one embodiment, the current vehicle navigates using a fusion of sensor inputs. These inputs can be derived from both sensors of the current vehicle and data collected by sensors of another vehicle and received by the current vehicle. In one example, the current vehicle builds a map of all objects that have been detected by the current vehicle and other vehicles as determined by the current vehicle based on the received object data. The current vehicle creates navigation path through the objects based on this map. In some embodiments, at least a portion of this map can be stored as part of a map stored on a server in a cloud and used by several vehicles for navigation control.

In some embodiments, other information in addition to physical object data can be exchanged between the current vehicle and other vehicles. For example, the vehicles can exchange information regarding other aspects of operation such as vehicle location, acceleration, braking, system status, etc. This other information can be used along with the object data for controlling navigation of the current vehicle.

In one embodiment, a currently-navigating vehicle can store object data received from other vehicles in the form of a map of objects. For example, the map can store data regarding a stop sign detected by one or more other vehicles. The map includes, for example, a location of the stop sign.

In one case, for example, the map can be stored in memory of the current vehicle itself after being directly received from a nearby other vehicle (e.g., by a direct car-to-car radio transmission). In another case, for example, the map can be stored on a server of a cloud service (e.g., the map can be downloaded to a current vehicle in response to a request by the current vehicle or a determination of a present or future location of the current vehicle). Map data stored in the map can include, for example, an object type and an object location for each of the objects in the map.

In some embodiments, data received by a current vehicle from other vehicles (e.g., directly from another vehicle and/or via a cloud service) traveling at or near the same location (e.g., as determined within a predetermined tolerance of distance or otherwise) is compared to data stored in the map. In one example, based on comparing the data received from the current vehicle to the stored map data, the operating status of the current vehicle can be determined. For example, a navigation status or state can be determined, and adjustments to the future navigation path of the current vehicle can be changed.

In addition to, or alternatively to, controlling the path a navigation, other aspects associated with operation of the current vehicle can be adjusted or configured. For example, a rate of acceleration, braking, etc. can be configured to operate in a different manner. This may occur, for example, due to data regarding one or more detected objects and/or data regarding other events such as inclement weather as may be received from other vehicles (e.g., other vehicles that are traveling the same road about 1-10 km ahead of the current vehicle).

In a different example, in addition to controlling a future navigation path, it may be determined that the current vehicle is failing to navigate properly based on a failure to detect a stop sign or other object (and a change in navigation may be performed in response to this determination). In another example, it may be determined that the current vehicle is failing to navigate properly based on a detection of a stop sign that does not properly match data that is stored in the map regarding the stop sign as collected from other vehicles previously traveling on the same road. For example, the current vehicle may detect a location of the stop sign, but the newly-detected location does not match the location of the stop sign as stored in the map (e.g., does not match within a predetermined distance tolerance, such as for example, within 5-50 meters). In such a case, the current vehicle is determined as failing to operate properly (even though the object itself was detected, at least to some extent), and navigation or other vehicle operation is adjusted.

Various embodiments as described below are used to control the navigation and/or other operation of a current vehicle based on object and/or other event data received from one or more other vehicles. Data is received regarding physical objects detected by other vehicles. A map can be stored that includes locations for each of these detected objects. For example, as mentioned, the map can include data collected by other vehicles traveling the same road.

In one embodiment, subsequent to receiving data regarding objects detected by other vehicles, new data can be received regarding a new object detected by the current vehicle and/or other vehicles. The new data can include location data for the new object. The new data also may include an object type for the new object.

In one embodiment, the map is stored in a cloud storage or other service (sometimes referred to herein simply as the "cloud"). A server having access to the map controls navigation of the current vehicle. The server also may determine, based on comparing received new data to the map data, whether the current vehicle is operating properly.

For example, the server can determine based on this comparison that the newly-received data fails to match data for at least one object stored in the map. In response to this determination, the server can perform one or more actions. For example, the server can send a communication to the current vehicle. In one case, the communication can cause the current vehicle to take corrective actions, such as terminating an autonomous navigation mode. The communication may also cause a change in navigation control.

In various embodiments, objects detected by other vehicles (e.g., passive objects, such as traffic signs, traffic lights, etc.) are transmitted to the cloud service. The cloud service creates a dynamic map containing the type of object detected and its location (e.g., the map stores data that a stop sign is located at a position x, y). The cloud service stores the map (e.g., in a database or other data repository).

In one embodiment, the cloud service controls navigation by sending a communication to the current vehicle that provides data regarding how the current vehicle should respond (e.g., how to navigate based on the map stored at the cloud service). For example, in response to receiving the communication, the current vehicle can change autonomous driving modes, use a backup system, and/or activate a braking system to stop the vehicle.

In one embodiment, one or more sensors on the other vehicles are used to obtain data regarding objects in the environment for which the current vehicle will later travel (e.g., along the same route). Data from the sensors and/or data generated based on analysis of sensor data and/or other data can be, for example, transmitted to the cloud service wirelessly (e.g., using a 3G, 4G, or 5G network or other radio-based communication system).

In one embodiment, based on object data received from other vehicles, one or more actions of the current vehicle are configured. For example, an over-the-air firmware update can be sent to the vehicle for updating firmware of a computing device of the current vehicle being navigated. In one example, the firmware updates a navigation system of the vehicle. The updated configuration is based at least in part on analysis of data that is collected from the current vehicle.

In various other embodiments, the configuration of one or more actions performed by the vehicle may include, for example, actions related to operation of the vehicle itself and/or operation of other system components mounted in the vehicle and/or otherwise attached to the vehicle. For example, the actions may include actions implemented via controls of an infotainment system, a window status, a seat position, and/or driving style of the vehicle.

In some embodiments, the analysis of data collected by the current or other vehicles includes providing the data as an input to a machine learning model. The current vehicle is controlled by performing one or more actions that are based on an output from the machine learning model.

In one example, a machine learning model is trained and/or otherwise used to configure a vehicle (e.g., tailor actions of the vehicle). For example, the machine learning model may be based on pattern matching in which prior patterns of sensor inputs or other data is correlated with desired characteristics or configuration(s) for operation of the vehicle.

In one embodiment, data received from the other vehicles may include sensor data collected by the vehicle during its real world services (e.g., when the user is a driver or a passenger). In one embodiment, the data is transmitted from the other nearby vehicles to a centralized server (e.g., of a cloud service), which performs machine learning/training, using a supervised method and the received sensor data and/or other data, to generate an updated ANN model that can be subsequently loaded into the current vehicle being navigated to replace its previously-installed ANN model. The model is used to configure the operation of the currently-navigated vehicle.

In some embodiments, the driver can take over certain operations from the current vehicle in response to the current vehicle receiving a communication that navigation or other operation should be adjusted or changed. In one example, the current vehicle is configured in real-time to respond to the received object data.

Collecting Object Data Using a Vehicle

FIG. 1 illustrates a sensing system located on board a vehicle 200 for collecting information concerning operation of the vehicle, according to one embodiment. The sensing system can be used to collect object data for sending to another currently-navigated vehicle and/or to a cloud service to be stored in a map (e.g., the map can additionally be used to control navigation of vehicles other than the current vehicle). In an alternative embodiment, the sensing system can be used on a current vehicle for which navigation is being controlled.

The sensing system, in various embodiments, may generally include one or more sensors 220, a processor 230, memory 240, and a communication device (e.g., transmitter 250). Other data in addition to object data can be collected for sending to the cloud service.

The sensing system, in various embodiments, may include one or more sensors 220 configured to collect information regarding operational aspects of autonomous vehicle 200, such as speed, vehicle speed, vehicle acceleration, braking force, braking deceleration, and the like. Representative sensors configured to collect information concerning operational driving characteristics may include, without limitation, tachometers like vehicle speed sensors or wheel speed sensor, brake pressure sensors, fuel flow sensors, steering angle sensors, and the like.

The sensing system, in various embodiments, may additionally or alternatively include one or more sensors 220 configured to collect information regarding the static environment in which autonomous vehicle 200 is operated, such as the presence and content of physical objects surrounding the vehicle. The physical objects include, for example, signage and traffic signals (e.g., stop signs, construction zones, speed limit signs, stop lights), road lane dividers (e.g., solid and dashed lane lines), and the like. Representative sensors configured to collect such static operating environment information may include outward-facing cameras positioned and oriented such that their respective fields of view can capture the respective information each is configured to collect. For example, a camera configured to capture surrounding signage may be configured towards the front of or on top of autonomous vehicle 200 and oriented forward-facing (e.g., straight ahead or perhaps canted sideways by up to about 45 degrees) so as to capture roadside and overhead signage/traffic signals within its field of view as autonomous vehicle 200 travels forward.

As another example, cameras configured to capture road lane dividers may be positioned on the side of or off a front/rear quarter of autonomous vehicle 200 and may be oriented somewhat downwards so as to capture road lane dividers on both sides of vehicle autonomous 200. Additional representative sensors for collecting static operating environment information may include receivers configured to receive wireless signals from base stations or other transmitters communicating information that may ordinarily be found on signage or otherwise related to the static operating environment of autonomous vehicle 200. Likewise, global positioning system (GPS) or other location-related sensors may be utilized to collect information regarding the static environment in which vehicle 200 is operated, such as what street autonomous vehicle 200 is driving on, whether that street is a traffic artery (e.g., highway) or other type, and whether that location is in an urban or rural area.

The sensing system, in various embodiments, may additionally or alternatively include one or more sensors 220 configured to collect information regarding the dynamic environment in which autonomous vehicle 200 is operated, such as information concerning the presence of moving objects such as, for example, other nearby vehicles (e.g., along with such vehicle's location, direction of travel, rate of speed, and rate of acceleration/deceleration), as well as similar information concerning the presence of nearby pedestrians. Representative sensors configured to collect such dynamic operating environment information may include outward-facing cameras positioned and oriented such that their respective fields of view can capture the respective information each is configured to collect. For example, outward-facing cameras may be positioned about the perimeter of autonomous vehicle 200 (e.g., on the front, rear, top, sides, and/or quarters) to capture imagery to which image processing techniques such as vehicle recognition algorithms may be applied. Additionally or alternatively, one or more optical sensors (e.g., LIDAR, infrared), sonic sensors (e.g., sonar, ultrasonic), or similar detection sensors may be positioned about the vehicle for measuring dynamic operating environment information such as distance, relative velocity, relative acceleration, and similar characteristics of the motion of nearby piloted or autonomous vehicles 300.

The sensing system, in various embodiments, may leverage as sensor(s) 220 those sensors typically found in most autonomous vehicles such as, without limitation, those configured for measuring speed, RPMs, fuel consumption rate, and other characteristics of the vehicle's operation, as well as those configured for detecting the presence of other vehicles or obstacles proximate the vehicle. Sensors 220 may additionally or alternatively comprise aftermarket sensors installed on autonomous vehicle 200 for facilitating the collection of additional information related to driving style.

The sensing system of vehicle 200, in various embodiments, may further comprise an onboard processor 230, onboard memory 240, and an onboard transmitter 250. Generally speaking, in various embodiments, processor 230 may be configured to execute instructions stored on memory 240 for processing information collected by sensor(s) 200 for subsequent transmission offboard vehicle 200. Onboard processor 230, in various embodiments, may additionally or alternatively be configured to execute instructions stored on memory 240 for processing information from two or more sensors 220 to produce further information concerning object characteristics detected by autonomous vehicle 200. For example, in an embodiment, processor 230 may process operational characteristics, such as braking deceleration, alongside dynamic environment characteristics, such as following distance, to avoid debris or an animal suddenly appearing in the roadway. It should be recognized that this is merely an illustrative example, and that one of ordinary skill in the art will recognize further ways sensor data may be processed by a processor to produce further information concerning objects detected by autonomous vehicle 200.

Processor 230, in various embodiments, may be configured to pre-process information from sensor(s) 220 for subsequent offboard transmission via transmitter 250. Pre-processing activities may include one or a combination of filtering, organizing, and packaging the information from sensors 220 into formats and communications protocols for efficient wireless transmission. In such embodiments, the pre-processed information may then be transmitted offboard vehicle 200 by transmitter 250 in real-time or at periodic intervals, where it may be received by nearby piloted or autonomous vehicles 300 and/or remote server 400 as later described in more detail. It should be appreciated that transmitter 250 may utilize short-range wireless signals (e.g., Wi-Fi, BlueTooth) when configured to transmit the pre-processed information directly to nearby piloted or autonomous vehicles 300, and that transmitter 250 may utilize longer-range signals (e.g., cellular, satellite) when transmitting the pre-processed information directly to remote server 400, according to various embodiments later described.

In some embodiments, transmitter 250 may additionally or alternatively be configured to form a local mesh network (not shown) for sharing information with multiple nearby piloted or autonomous vehicles 300, and perhaps then to remote server 400 via a wide area network access point. Transmitter 250 may of course use any wireless communications signal type and protocol suitable for transmitting the pre-processed information offboard vehicle 200 and to nearby piloted or autonomous vehicles 300 and/or remote server 400.

Like sensor(s) 220, in various embodiments, processor 230 and/or onboard transmitter 250 may be integrally installed in vehicle 200 (e.g., car computer, connected vehicles), while in other embodiments, processor 230 and/or transmitter 250 may be added as an aftermarket feature.

Onboard and/or Offboard Evaluation of Object Data

Referring now to FIGS. 2A-2E, in various embodiments, a system may be configured to collect data regarding objects and/or analyze the data for objects that are detected by autonomous vehicle 200. According to various embodiments of the present disclosure, processing of the collected data may be performed either onboard autonomous vehicle 200 or at an offboard location, as explained in further detail below.

Figure 2A:
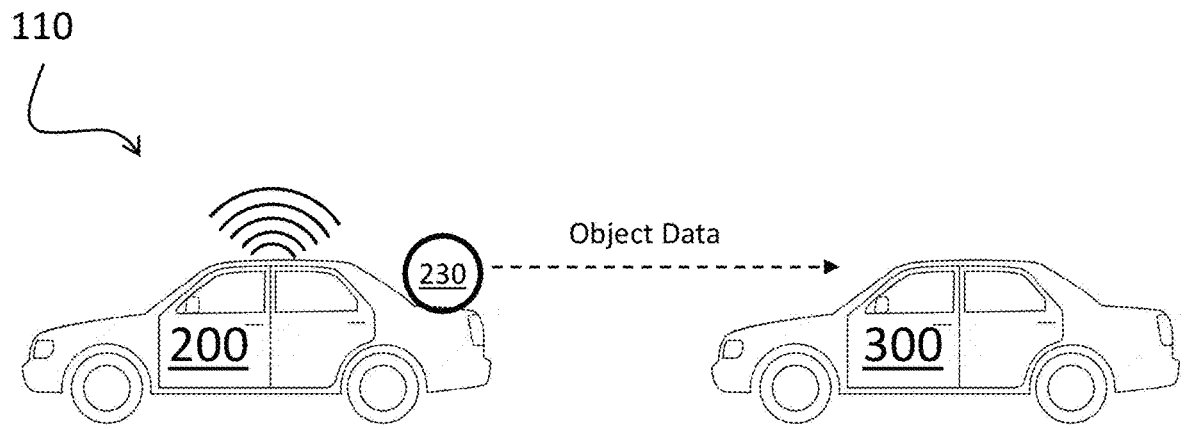
FIGS. 2A and 2B illustrate embodiments in which evaluation of object data occurs onboard an autonomous vehicle, according to one embodiment.
Figure 2B:
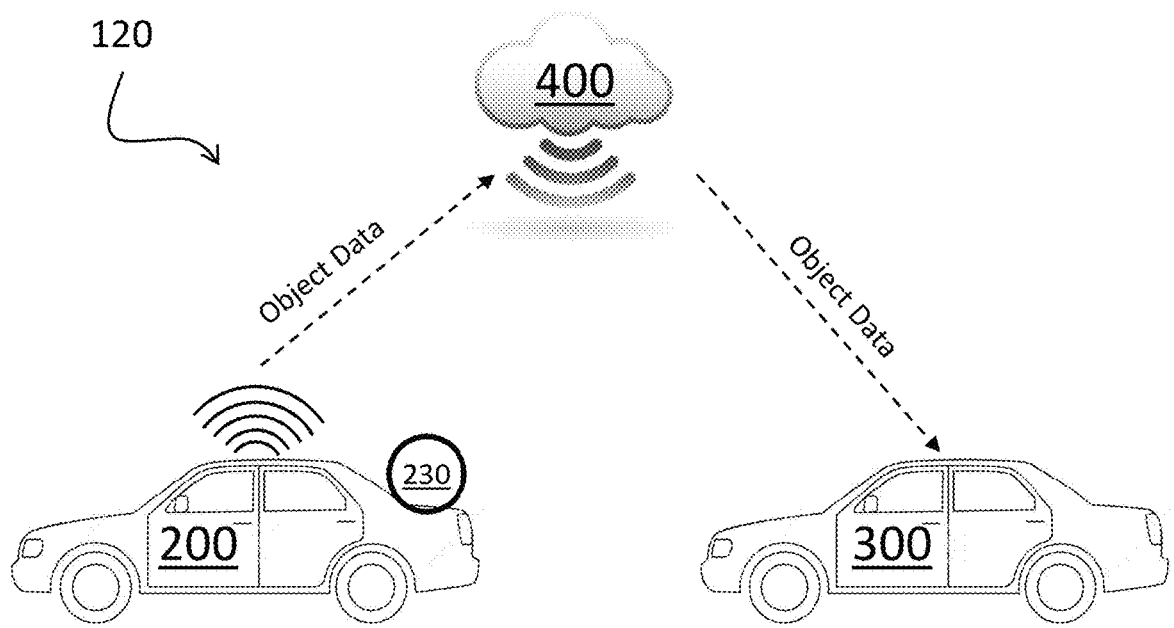

FIGS. 2A and 2B illustrate embodiments 110 and 120, respectively, in which processing of object data occurs onboard autonomous vehicle 200, according to one embodiment. In one such embodiment, processor 230 may be configured to execute instructions stored on memory 240 for evaluating object data collected by sensor(s) 220.

Object data (e.g., location and type), patterns and other information relevant to characterizing the detected objects may be transmitted to nearby piloted or autonomous vehicle 300 via transmitter 250. For example, navigation for vehicle 300 is being controlled in real-time based at least in part on object data provided by vehicle 200.

In embodiment 110, object data may be sent directly to nearby piloted or autonomous vehicle 300 as shown in FIG. 2A, whereas in embodiment 120, object data may be sent indirectly to nearby piloted or autonomous vehicle 300 via remote server 400 as shown in FIG. 2B. In the latter embodiment 120, remote server 400 may immediately relay the driving characteristics to nearby piloted or autonomous vehicle 300 or may store object data associated with autonomous vehicle 200 from the current and/or past trips (e.g., store in a map). Remote server 400 may then transmit current and/or historical object data to nearby piloted or autonomous vehicle 300 when requested by nearby piloted or autonomous vehicle 300 or when directed to do so by autonomous vehicle 200.

It should be appreciated that for embodiments in which object data is evaluated, onboard vehicle 200 may have certain benefits. In many cases, one such benefit may be that transmitting object data may require less bandwidth than transmitting raw or pre-processed object data. Further, with reference to embodiment 120 in particular, it may be beneficial to transmit object data for storage on remote server 400. In one aspect, this may allow remote server 400 to offload storage responsibility from autonomous vehicle 200, thereby reducing the amount of memory (e.g., memory 240) required on vehicle 200. In another aspect, by storing object data on remote server 400, nearby piloted or autonomous vehicle 300 may access object data from remote server 400 without needing to establish a communications link with autonomous vehicle 200. First, this may improve security as it may be easier to implement robust security protocols and monitoring on communications between vehicles and remote server 400 than on vehicle-to-vehicle communications. Second, nearby piloted or autonomous vehicle 300 may be able to access object data stored in remote server 400 for at least past trips of autonomous vehicle 200 in the event autonomous vehicle 200 is unable to or otherwise does not establish communications links with remote server 400 or nearby piloted or autonomous vehicle 300 during the current trip.

Figure 2C:
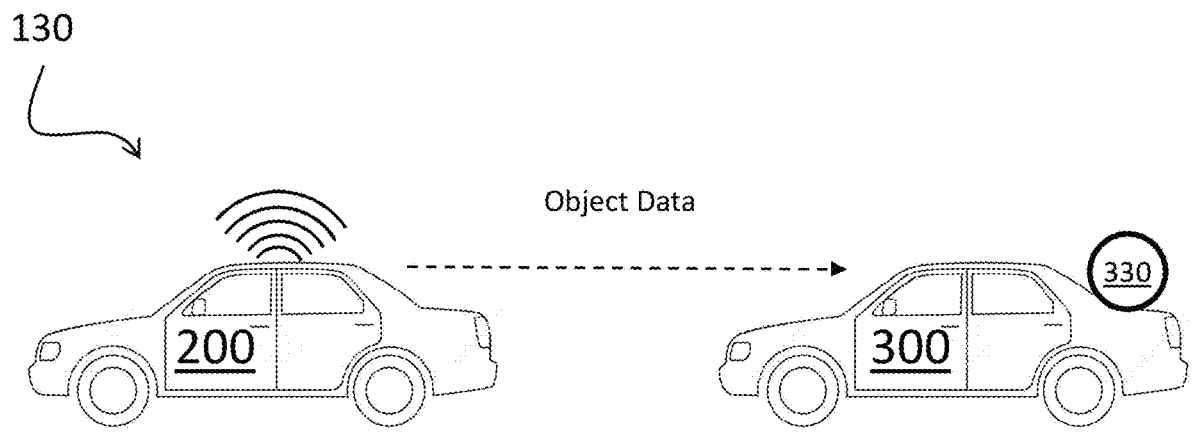
FIGS. 2C and 2D illustrate embodiments in which evaluation of object data occurs onboard a nearby piloted or autonomous vehicle, according to one embodiment.
Figure 2D:
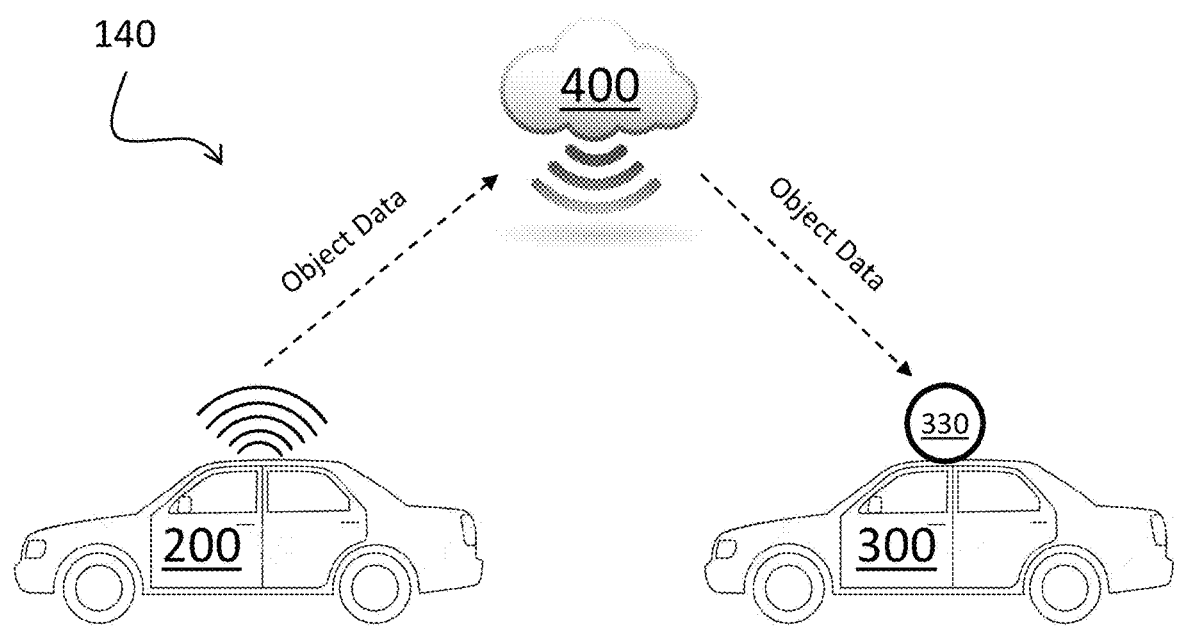

FIGS. 2C and 2D illustrate embodiments 130 and 140, respectively, in which the evaluation of object data may occur offboard vehicle 200. In particular, FIGS. 2C and 2D illustrate embodiments in which evaluation is performed onboard nearby piloted or autonomous vehicle 300. In one such embodiment, system 100 may further include a processor 330 configured to execute instructions stored on a memory 340 (also located onboard vehicle 300, in an embodiment) for evaluating object data transmitted from autonomous vehicle 200 (e.g., via transmitter 250). In embodiment 130, for example, object data may be sent directly to nearby piloted or autonomous vehicle 300 as shown in FIG. 2C, whereas in embodiment 140, object data may be sent indirectly to nearby piloted or autonomous vehicle 300 via remote server 400 as shown in FIG. 2D. In the latter embodiment 140, remote server 400 may immediately relay the object data to nearby piloted or autonomous vehicle 300 or instead store the object data from the current and/or past trips. Remote server 400 may then transmit object data to nearby piloted or autonomous vehicle 300 when requested by vehicle 300 or when directed to do so by vehicle 200.

It should be appreciated that embodiments in which object data is evaluated onboard nearby piloted or autonomous vehicle 300 may have certain benefits. In many cases, it may be desired that vehicle 300 evaluate object data received from autonomous vehicle 200 rather than a third-party processor (e.g., processor 230 of autonomous vehicle 200 or processor 430 of remote server 400, later described).

Figure 2E:
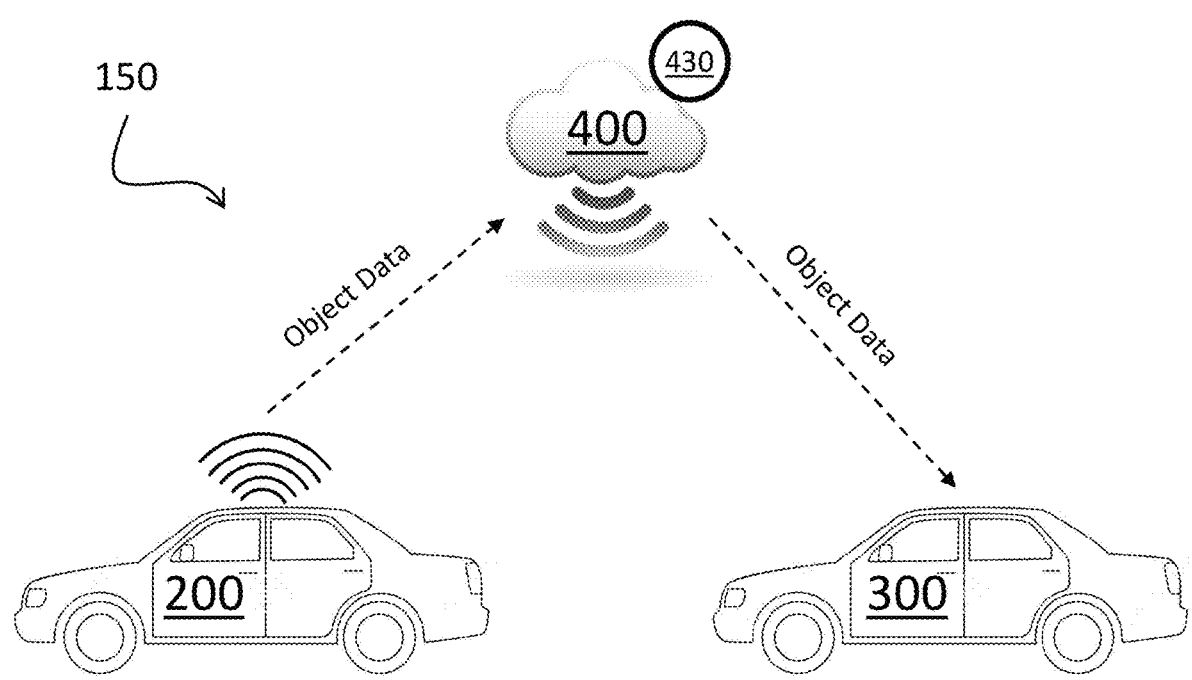
FIG. 2E illustrates an embodiment in which evaluation of object data occurs at a remote server, according to one embodiment.

FIG. 2E illustrates an embodiment 150 in which the processing of object data may occur offboard autonomous vehicle 200. In particular, FIG. 2E illustrates an embodiment in which the evaluation is performed at remote server 400. In one such embodiment, system 100 may further include a processor 430 configured to execute instructions stored on a memory 440 (also located offboard autonomous vehicle 200 and at or in communication with remote server 400, in an embodiment) for evaluating object data transmitted from autonomous vehicle 200 (e.g., via transmitter 250). In embodiment 150, for example, object data may be sent directly to remote server 400 for evaluation at remote server 400 as shown in FIG. 2E. Remote server 400 may then transmit object data to nearby piloted or autonomous vehicle 300 when requested by nearby piloted or autonomous vehicle 300 or when directed to do so by autonomous vehicle 200.

It should be appreciated that embodiments in which object data is evaluated at remote server 400 may have certain benefits. In many cases, one such benefit may be that transmitting driving style information may require less bandwidth than transmitting raw or pre-processed driving characteristics information and/or occupant feedback, as in many cases driving style information may represent a more distilled version of driving characteristics information and/or occupant feedback.

It may be beneficial to transmit object data from autonomous vehicle 200 for storage on remote server 400 for reasons similar to those described with reference to embodiment 140. This may allow remote server 400 to offload storage responsibility from autonomous vehicle 200, thereby reducing the amount of memory (e.g., memory 240) required on autonomous vehicle 200 for storing driving characteristics and/or occupant feedback.

Yet further benefits may be derived from evaluating object data at remote server 400. In one aspect, embodiment 150 may leverage enhanced computational power and storage capabilities at remote server 400 as opposed to perhaps more limited computational and storage capabilities on mobile platforms associated with vehicles 200, 300. In another aspect, performing evaluations at a central location can ensure consistent approaches are used across the system for characterizing object data. Still further, in another aspect, performing evaluations at a central location may allow for embodiment 150 to leverage big data analytics techniques for constantly improving object evaluation techniques. In particular, the multitude of evaluations performed at remote server 400 could be analyzed, perhaps along with feedback from nearby piloted or autonomous vehicles 300 across the system, based on actual empirical data and thereby improve evaluation techniques.

Various transmissions of object data amongst the various combinations of autonomous vehicle 200, nearby piloted or autonomous vehicle 300, and remote server 400 of the system may be initiated in accordance with any suitable requests, commands, and the like from any suitable source within the system. For example, with reference to embodiments 110 and 130 (i.e., local transmission amongst vehicles 200, 300), nearby piloted or autonomous vehicle 300 may detect the presence of autonomous vehicle 200 and send a request to autonomous vehicle 200 for object data. In another example, nearby piloted or autonomous vehicle 300 may detect the presence of autonomous vehicle 200 and send a request to remote server 400 for object data from autonomous vehicle 200. In one such embodiment, nearby piloted or autonomous vehicle 300 may identify autonomous vehicle 200 based on an identification beacon emitted by autonomous vehicle 200, wherein the beacon contains information suitable for accessing corresponding object data from remote server 400. In another such embodiment, nearby piloted or autonomous vehicle 300 may capture an image of autonomous vehicle's 200 license plate or other visual identifier (e.g., a barcode sticker affixed to autonomous vehicle 200) and transmit the image or identifier to remote server 400 for identification.

Controlling Navigation Using Object Data from Other Vehicles

Figure 3:
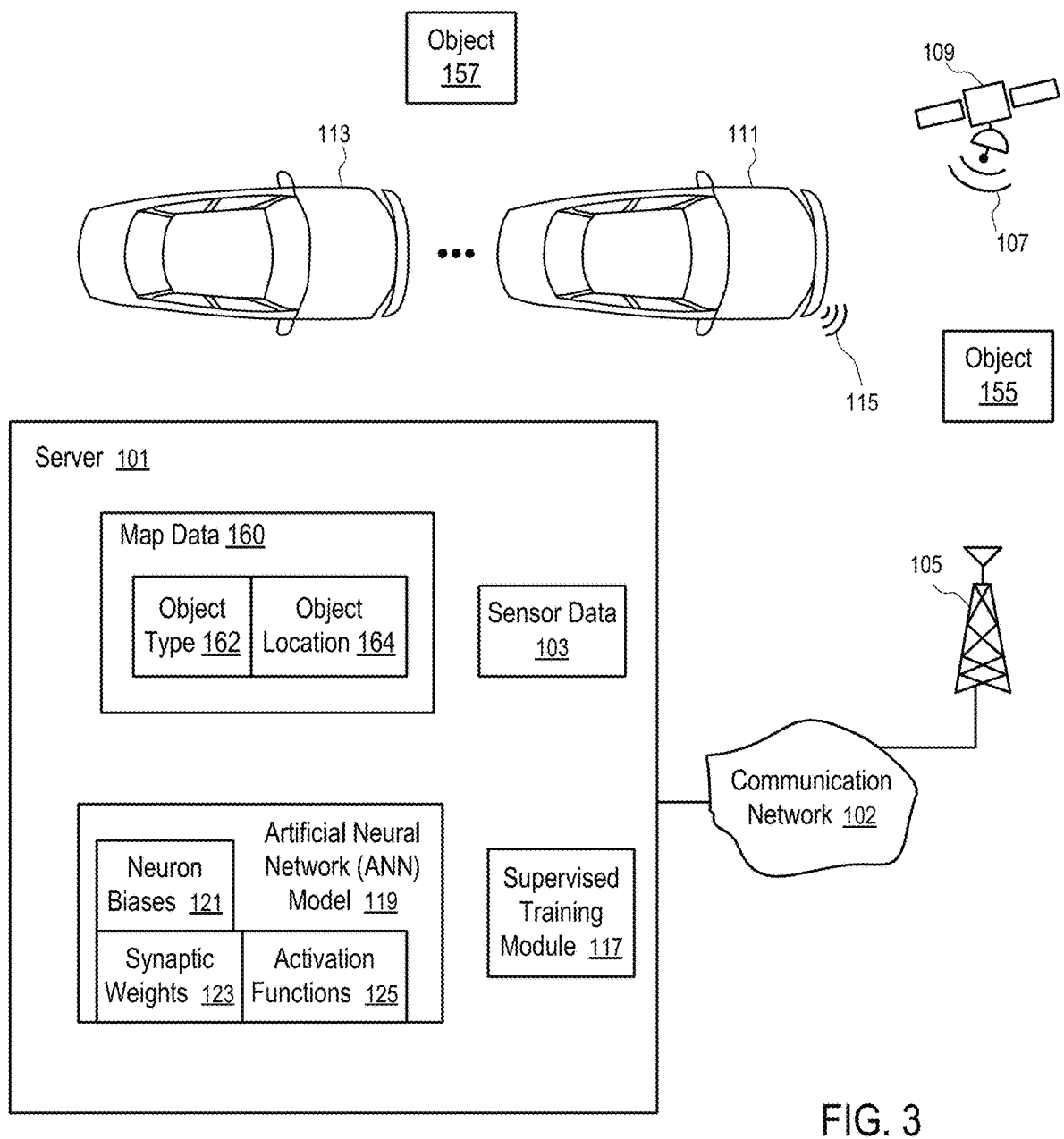
FIG. 3 illustrates a system to control navigation of a vehicle using data regarding objects detected by one or more other vehicles, according to one embodiment.

FIG. 3 illustrates a system to control navigation of a vehicle (e.g., a currently-navigated vehicle 113) using data regarding objects (e.g., objects 155, 157) detected by one or more other vehicles (e.g., other vehicle 111), according to one embodiment. Current vehicle 113 receives object data collected by vehicle 111 and/or other vehicles, as described in more detail below. Current vehicle 113 uses the received object data (e.g., along with other data such as data collected by current vehicle 113 itself) to control navigation.

The system uses an Artificial Neural Network (ANN) model in some embodiments, as described below. The system of FIG. 3 includes a centralized server 101 in communication with a set of vehicles 111, . . . , 113 via a communications network 102.

For example, vehicle 111 can be one of a plurality of vehicles (other than current vehicle 113) that has detected objects during travel (e.g., traveling ahead of current vehicle 113 on the same road). These objects can include, for example, object 155 and object 157. Sensors of vehicle 111 (and any other vehicles) collect and/or generate data regarding the objects that have been detected. At least a portion of this detected data is sent to current vehicle 113 (e.g., sent indirectly via server 101, and/or sent directly by short-range radio transmission from other vehicle 111 to current vehicle 113).

For example, data regarding the detected objects is sent, via communications network 102, to a computing device such as server 101 (e.g., which may be part of a cloud service). Server 101 receives the object data from other vehicle 111 and the other vehicles. In some embodiment, server 101 stores a map (based in part on data from other vehicle(s) 111) including map data 160, which may include a number of records for each object. In one example, map data 160 includes an object type 162 and object location 164 for each object. Map data 160 can be sent to current vehicle 113 and used as an input for controlling navigation.

In some embodiments, subsequent to receiving the data regarding detected objects from the other vehicles, current vehicle 113 additionally transmits data regarding new objects that are being detected during travel. For example, object 155 can be a new object from the perspective of current vehicle 113. Object data collected by current vehicle 113 can be sent to server 101, and may be used in addition to object data received from other vehicles (e.g., data collected by vehicle 113 may be also used as part of monitoring and/or controlling the operation of current vehicle 113).

Server 101 receives data regarding object 155 from vehicle 111. In some cases, vehicle 111 and/or vehicle 113 send their current locations to server 101. One or more of these locations are used by server 101 to determine whether to send object data from vehicle 111 to current vehicle 113.

In one embodiment, sensor data 103 can be collected in addition to map data 160. Sensor data 103 can be, for example, provided by the current vehicle 113 and/or other vehicles 111 (e.g., sensor data 103 may be for data other than object data, such as temperature, acceleration, audio, etc.). Sensor data 103 can be used in combination with map data 160 and/or other new data received from current vehicle 113 to control navigation and/or perform an analysis of the operating status of vehicle 113. In some cases, some or all of the foregoing data can be used to train artificial neural network model 119. Additionally, in some cases, an output from artificial neural network model 119 can be used as part of configuring or otherwise controlling navigation of current vehicle 113.

In one embodiment, data from vehicle 113 is collected by sensors located in vehicle 113. The collected data is analyzed, for example, using a computer model such as an artificial neural network (ANN) model. In one embodiment, the collected data is provided as an input to the ANN model. For example, the ANN model can be executed on server 101 and/or vehicle 113. The vehicle 113 is controlled based on at least one output from the ANN model. For example, this control includes performing one or more actions based on the output. These actions can include, for example, control of steering, braking, acceleration, and/or control of other systems of vehicle 113 such as an infotainment system and/or communication device.

In one embodiment, the server 101 includes a supervised training module 117 to train, generate, and update ANN model 119 that includes neuron biases 121, synaptic weights 123, and activation functions 125 of neurons in a network used for processing collected data regarding a vehicle and/or sensor data generated in the vehicles 111, . . . 113.

In one embodiment, once the ANN model 119 is trained and implemented (e.g., for autonomous driving and/or an advanced driver assistance system), the ANN model 119 can be deployed on one or more of vehicles 111, . . . , 113 for usage.

In various embodiments, the ANN model is trained using data as discussed above. The training can be performed on a server and/or the vehicle. Configuration for an ANN model as used in a vehicle can be updated based on the training. The training can be performed in some cases while the vehicle is being operated.

Typically, the vehicles 111, . . . , 113 have sensors, such as a visible light camera, an infrared camera, a LIDAR, a RADAR, a sonar, and/or a set of peripheral sensors. The sensors of the vehicles 111, . . . , 113 generate sensor inputs for the ANN model 119 in autonomous driving and/or advanced driver assistance system to generate operating instructions, such as steering, braking, accelerating, driving, alerts, emergency response, etc.

During the operations of the vehicles 111, . . . , 113 in their respective service environments, the vehicles 111, . . . , 113 encounter items, such as events or objects, that are captured in the sensor data. The ANN model 119 is used by the vehicles 111, . . . , 113 to provide the identifications of the items to facilitate the generation of commands for the operations of the vehicles 111, . . . , 113, such as for autonomous driving and/or for advanced driver assistance.

For example, vehicle 111 and/or 113 may communicate, via a wireless connection 115 to an access point (or base station) 105, with the server 101 to submit sensor input to enrich the sensor data 103 as an additional dataset for machine learning implemented using the supervised training module 117. The wireless connection 115 may be made via a wireless local area network, a cellular communications network, and/or a communication link 107 to a satellite 109 or a communication balloon. In one example, user data collected from a vehicle can be similarly transmitted to the server.

Optionally, the sensor input stored in the vehicle 113 may be transferred to another computer for uploading to the centralized server 101. For example, the sensor input can be transferred to another computer via a memory device, such as a Universal Serial Bus (USB) drive, and/or via a wired computer connection, a Bluetooth or WiFi connection, a diagnosis tool, etc.

Periodically, the server 101 runs the supervised training module 117 to update the ANN model 119 based on updated data that has been received. The server 101 may use the sensor data 103 enhanced with the other data based on prior operation by similar vehicles (e.g., vehicle 111, 113) that are operated in the same geographical region or in geographical regions having similar traffic conditions (e.g., to generate a customized version of the ANN model 119 for the vehicle 111, 113).

Optionally, the server 101 uses the sensor data 103 along with object data received from a general population of vehicles (e.g., 111, 113) to generate an updated version of the ANN model 119. The updated ANN model 119 can be downloaded to the current vehicle (e.g., vehicle 113) via the communications network 102, the access point (or base station) 105, and communication links 115 and/or 107 as an over-the-air update of the firmware/software of the vehicle.

Optionally, the vehicle 113 has a self-learning capability. After an extended period on the road, the vehicle 113 may generate a new set of synaptic weights 123, neuron biases 121, activation functions 125, and/or neuron connectivity for the ANN model 119 installed in the vehicle 113 using the sensor inputs it collected and stored in the vehicle 113. As an example, the centralized server 101 may be operated by a factory, a producer or maker of the vehicles 111, . . . , 113, or a vendor of the autonomous driving and/or advanced driver assistance system for vehicles 111, . . . , 113.

Figure 4:
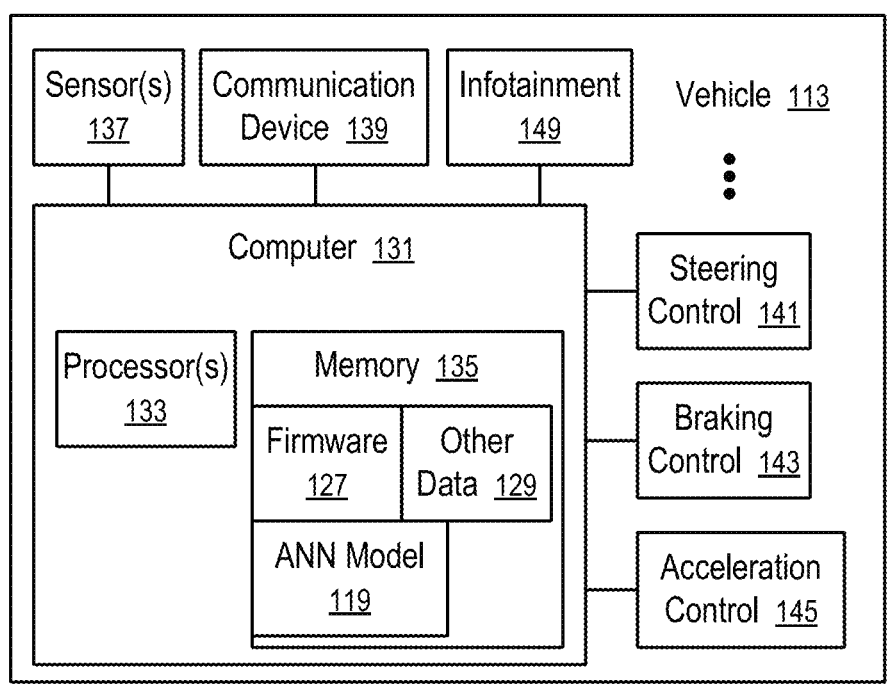
FIG. 4 shows an example of a vehicle configured using an Artificial Neural Network (ANN) model, according to one embodiment.

FIG. 4 shows an example of a currently-navigated vehicle 113 configured using an Artificial Neural Network (ANN) model, according to one embodiment. The navigation of vehicle 113 is controlled at least in part based on object data received from one or more other vehicles.

The vehicle 113 of FIG. 4 includes an infotainment system 149, a communication device 139, one or more sensors 137, and a computer 131 that is connected to some controls of the vehicle 113, such as a steering control 141 for the direction of the vehicle 113, a braking control 143 for stopping of the vehicle 113, an acceleration control 145 for the speed of the vehicle 113, etc.

In some embodiments, computer 131 generates a navigation path for vehicle 113 based on received object data. For example, configuration data (e.g., object data, updated ANN parameters, etc.) received from server 101 can be stored in memory 135 and used to update the manner in which navigation is operated or otherwise controlled on vehicle 113.

The computer 131 of the vehicle 113 includes one or more processors 133, memory 135 storing firmware (or software) 127, the ANN model 119 (e.g., as illustrated in FIG. 3), and other data 129.

In one example, firmware 127 is updated by an over-the-air update sent from server 101 to update navigation control of vehicle 113. Alternatively, and/or additionally, other firmware of various computing devices or systems of vehicle 113 can be updated.

The one or more sensors 137 may include a visible light camera, an infrared camera, a LIDAR, RADAR, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip. Data from this identification and/or classification can be included in object data used to generate a navigation path for vehicle 113.

Alternatively, and/or additionally, the identification or classification of an event or object generated by ANN model 119 can be used by an autonomous driving module of the firmware (or software) 127, or an advanced driver assistance system, to generate a response. The response may be a command to activate and/or adjust one of the vehicle controls 141, 143, and 145. In one embodiment, the response is an action performed by the vehicle where the action has been configured based on an update command from server 101 (e.g., the update command can be generated by server 101 in response to determining that vehicle 113 is failing to properly detect objects). In one embodiment, prior to generating the control response, the vehicle is configured. In one embodiment, the configuration of the vehicle is performed by updating firmware of vehicle 113. In one embodiment, the configuration of the vehicle includes updating of the computer model stored in vehicle 113 (e.g., ANN model 119).

The server 101 stores the received sensor input as part of the sensor data 103 for the subsequent further training or updating of the ANN model 119 using the supervised training module 117. When an updated version of the ANN model 119 is available in the server 101, the vehicle 113 may use the communication device 139 to download the updated ANN model 119 for installation in the memory 135 and/or for the replacement of the previously installed ANN model 119. These actions may be performed in response to determining that navigation for vehicle 113 should be controlled in some manner.

In one example, the outputs of the ANN model 119 can be used to control (e.g., 141, 143, 145) the acceleration of a vehicle (e.g., 113), the speed of the vehicle 113, and/or the direction of the vehicle 113, during autonomous driving or provision of advanced driver assistance.

In one example, data obtained from a sensor of vehicle 113 may be an image that captures an object using a camera that images using lights visible to human eyes, or a camera that images using infrared lights, or a sonar, radar, or LIDAR system. In one embodiment, image data obtained from at least one sensor of vehicle 113 is part of the collected data from the current vehicle that was analyzed. In some instances, the ANN model is configured for a particular vehicle 113 based on the sensor and other collected data.

Figure 5:
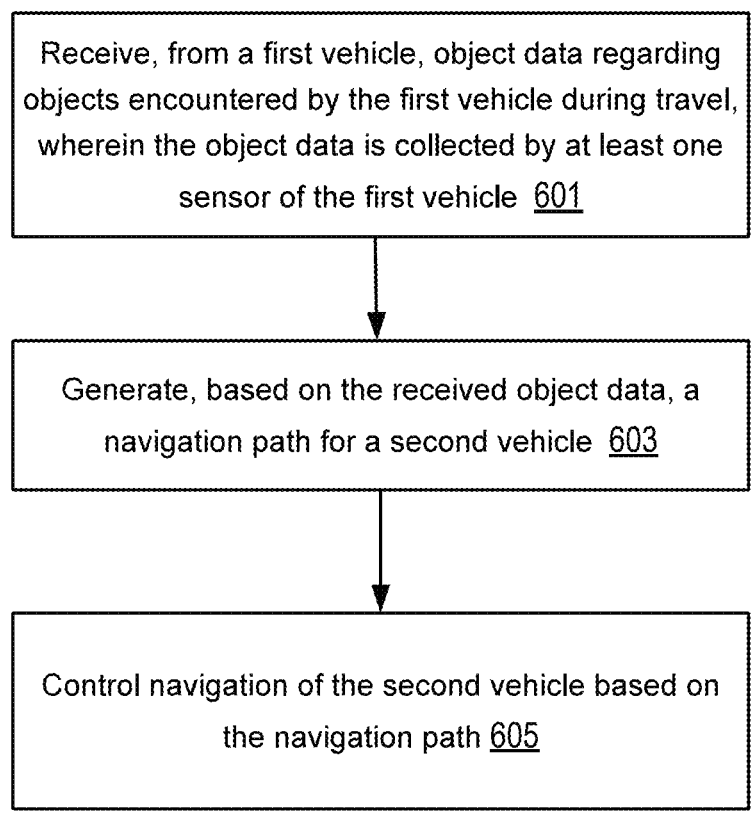
FIG. 5 shows a method to control navigation of a vehicle based on object data received from one or more other vehicles, according to one embodiment.

FIG. 5 shows a method to control navigation of a vehicle (e.g., current vehicle 113) based on object data (e.g., object location and type) received from one or more other vehicles (e.g., other vehicle 111) according to one embodiment. In block 601, data is received regarding objects detected by another vehicle (e.g., a first vehicle arriving at a location prior to a second vehicle arriving later). The detected objects include a first object (e.g., a stop sign).

In block 603, a navigation path is generated based on the received object data. For example, each object has an object type and a location (e.g., a geographic position). In block 605, subsequent to receiving the data regarding objects detected by the other vehicles, navigation of the receiving current vehicle is controlled (e.g., navigation of vehicle 113).

In one embodiment, a system includes: at least one processor; and memory storing instructions configured to instruct the at least one processor to: receive, from a first vehicle (e.g., other vehicle 111), object data regarding objects encountered by the first vehicle during travel, wherein the object data is collected by at least one sensor of the first vehicle; generate, based on the received object data, a navigation path for a second vehicle (e.g., current vehicle 113); and control navigation of the second vehicle based on the navigation path.

In one embodiment, the instructions are further configured to instruct the at least one processor to determine that the first vehicle is within a predetermined proximity of the second vehicle. In one embodiment, the predetermined proximity is a distance from the first vehicle to the second vehicle. In one embodiment, determining that the first vehicle is within a predetermined proximity of the second vehicle comprises: determining a first location of the first vehicle; determining a second location of the second vehicle; and comparing the first location to the second location.

In one embodiment, determining that the first vehicle is within a predetermined proximity of the second vehicle comprises: determining a first time that the object data was collected by the at least one sensor of the first vehicle when the first vehicle was at a first location; determining a second time that the second vehicle is expected to be at the first location; and determining that the time difference between the first time and the second time is within a predetermined tolerance.

In one embodiment, receiving the object data regarding objects encountered by the first vehicle is performed after determining that the first vehicle is within the predetermined proximity of the second vehicle.

In one embodiment, the object data is received by a communication device of the second vehicle while the second vehicle is within a wireless communication range of the first vehicle.

In one embodiment, the received object data includes a first object, and the first object is outside of a detection range of the second vehicle at the time the object data is received.

In one embodiment, a non-transitory computer storage medium stores instructions which, when executed on a computing device, cause the computing device to perform a method comprising: receiving, from a first vehicle, object data regarding at least one object, wherein the object data is based on data collected by at least one sensor of the first vehicle; and controlling navigation of a second vehicle based on the object data.

In one embodiment, the object data comprises data obtained from an artificial neural network model of the first vehicle.

In one embodiment, the computing device is a server that monitors an operating status for each of a plurality of vehicles, and the plurality of vehicles includes at least one of the first vehicle or the second vehicle.

In one embodiment, controlling navigation of the second vehicle is performed in response to a determination that: the second vehicle is within a predetermined distance of a prior location of the first vehicle at which the first vehicle collected data regarding surrounding objects; or the second vehicle is within a predetermined distance of a present location of the first vehicle.

Figure 6:
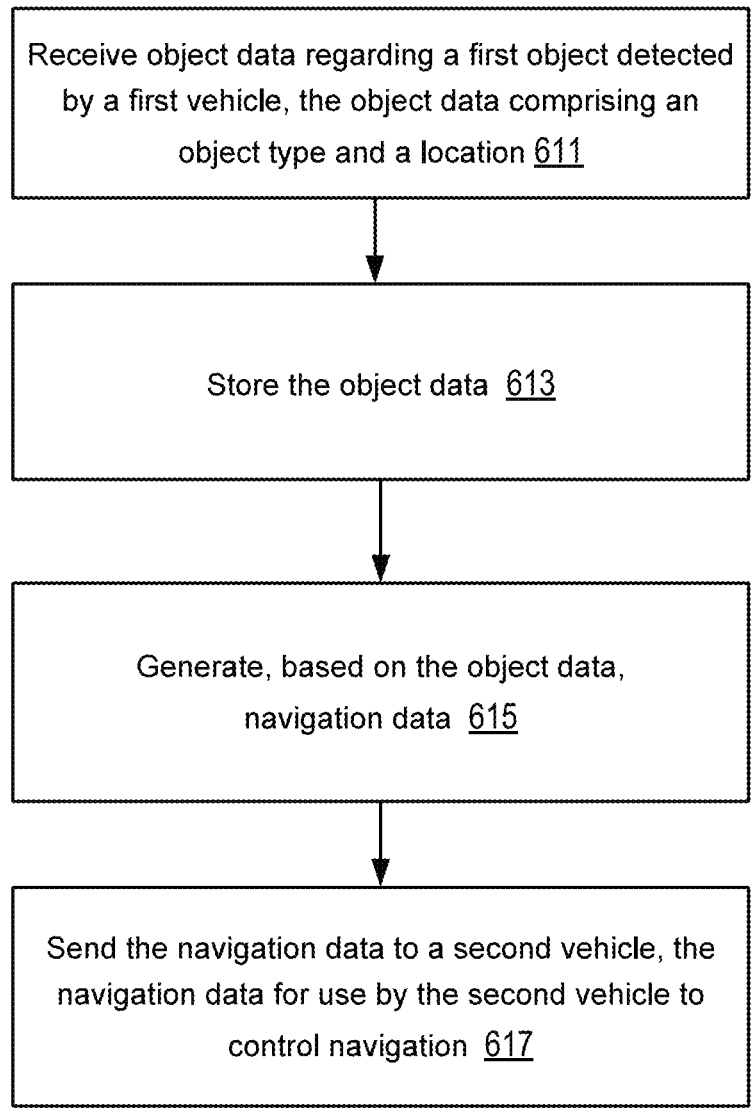
FIG. 6 shows a method to control navigation of vehicle based on navigation data generated using object data received from another vehicle, according to one embodiment.

FIG. 6 shows a method to control navigation of vehicle (e.g., current vehicle 113) based on navigation data generated using object data received from another vehicle, according to one embodiment. In block 611, object data is received regarding one or more objects detected by one or more other vehicles.

In block 613, the object data is stored. In one example, the object data is received directly from the other vehicle and stored in memory of the current vehicle. In another example, the object data is received by a server in a cloud service. The object data may, for example, be stored as part of a map that includes locations for each of the objects detected by other vehicles. For example, the stored map includes map data 160 and is stored in the cloud.

In block 615, navigation data is generated based on the object data. In some cases, the navigation is simply object data. For example, the navigation data may include locations of objects detected by the vehicles. In this example, the current vehicle receives the locations of the objects and a processor of the current vehicle generates a navigation path. In other examples, the navigation data can include configuration data for updating firmware and/or an ANN model of the current vehicle.

In block 617, the navigation data is sent to the current vehicle. For example, navigation data is sent by server 101 to current vehicle 113.

In one embodiment, a method includes: receiving, by at least one processor of a computing device (e.g., server 101), object data regarding a first object detected by a first vehicle (e.g., other vehicle 111), the object data comprising an object type and a location; storing, by the at least one processor, the object data; generating, by the at least one processor and based on the object data, navigation data; and sending the navigation data to a second vehicle (e.g., current vehicle 113), the navigation data for use by the second vehicle to control navigation.

In one embodiment, the first object is beyond a detection range of the second vehicle when the first vehicle sends the object data to the computing device. In one embodiment, the first object is greater than a predetermined distance from the second vehicle when the object data is received from the first vehicle.

In one embodiment, the first object is a traffic sign, a traffic light, a road lane, or a physical structure. In one embodiment, the navigation data includes at least a portion of the object data.

In one embodiment, the method further comprises receiving object data regarding a second object detected by a third vehicle, wherein the navigation data includes the object data regarding the second object.

In one embodiment, the method further comprises determining, by the at least one processor, that the first vehicle is within a predetermined distance of the second vehicle, wherein the navigation data is sent to the second vehicle in response to determining that the first vehicle is within the predetermined distance.

In one embodiment, the object data is transmitted to the computing device by the first vehicle in response to a determination that the first vehicle is within a predetermined distance of the second vehicle.

Figure 7:
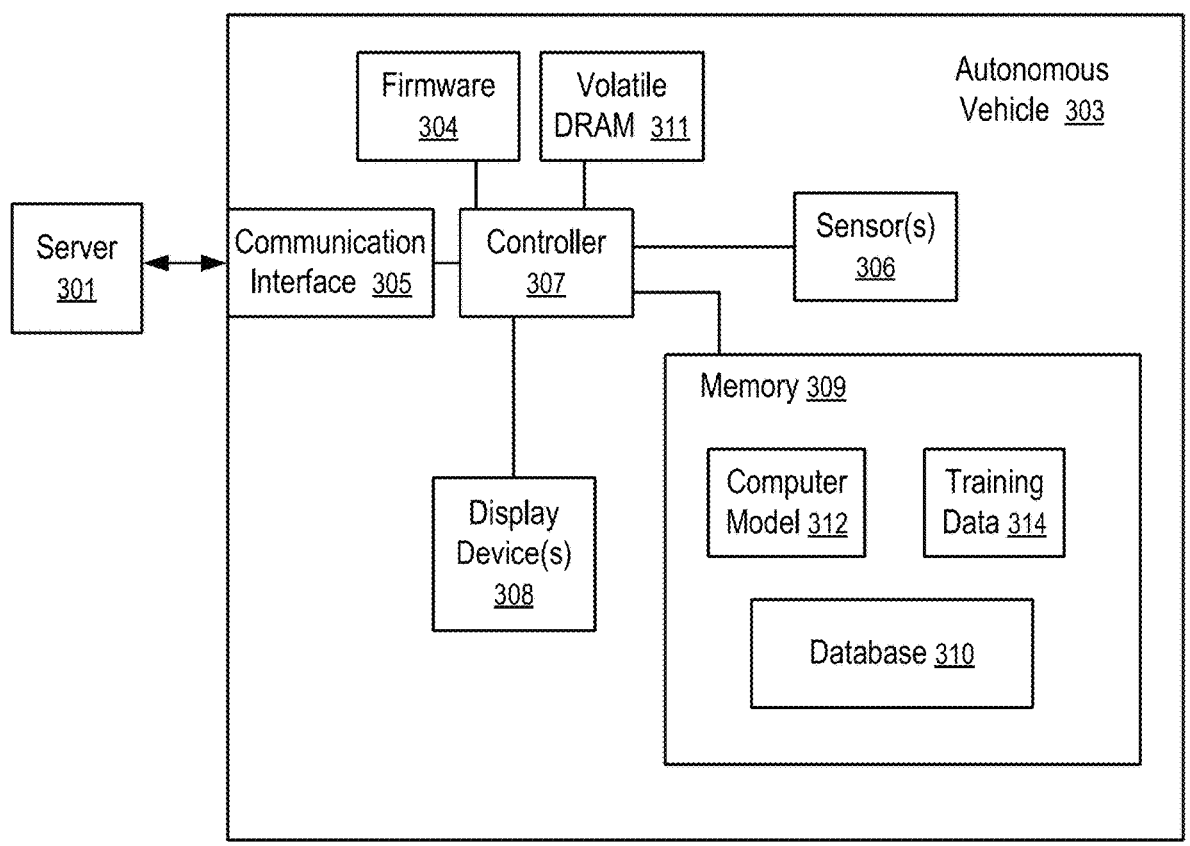
FIG. 7 shows an autonomous vehicle configured in response to object data received from another vehicle, according to one embodiment.

FIG. 7 shows an autonomous vehicle 303 configured in response to object data received from another vehicle, according to one embodiment. In one embodiment, a system controls a display device 308 (or other device, system, or component) of an autonomous vehicle 303. For example, a controller 307 controls the display of images on one or more display devices 308.

Server 301 may store, for example, object data (e.g., map data 160). Server 301 may control navigation (e.g., using map data 160) of vehicle 303. Navigation control actions may include, for example, configuring vehicle 303 by updating firmware 304, updating computer model 312, updating data in database 310, and/or updating training data 314.

The controller 307 may receive data collected by one or more sensors 306. The sensors 306 may be, for example, mounted in the autonomous vehicle 303. The sensors 306 may include, for example, a camera, a microphone, a motion detector, and/or a camera. At least a portion of the sensors may provide data associated with objects newly detected by vehicle 303 during travel.

The sensors 306 may provide various types of data for collection by the controller 307. For example, the collected data may include image data from the camera and/or audio data from the microphone.

In one embodiment, the controller 307 analyzes the collected data from the sensors 306. The analysis of the collected data includes providing some or all of the collected data as one or more inputs to a computer model 312. The computer model 312 can be, for example, an artificial neural network trained by deep learning. In one example, the computer model is a machine learning model that is trained using training data 314. The computer model 312 and/or the training data 314 can be stored, for example, in memory 309. An output from the computer model 312 can be transmitted to server 301 as part of object data for comparison to map data 160.

In one embodiment, memory 309 stores a database 310, which may include data collected by sensors 306 and/or data received by a communication interface 305 from computing device, such as, for example, a server 301 (server 301 can be, for example, server 101 of FIG. 3 in some embodiments). In one example, this communication may be used to wirelessly transmit collected data from the sensors 306 to the server 301. The received data may include configuration, training, and other data used to configure control of the display devices 308 by controller 307.

For example, the received data may include data (e.g., object data) collected from sensors of autonomous vehicles other than autonomous vehicle 303. This data may be included, for example, in training data 314 for training of the computer model 312. The received data may also be used to update a configuration of a machine learning model stored in memory 309 as computer model 312.

In FIG. 7, firmware 304 controls, for example, the operations of the controller 307 in controlling the display devices 308 and other components of vehicle 303. The controller 307 also can, for example, run the firmware 304 to perform operations responsive to communications from the server 301. The autonomous vehicle 303 includes volatile Dynamic Random-Access Memory (DRAM) 311 for the storage of run-time data and instructions used by the controller 307.

In one embodiment server 301 communicates with the communication interface 305 via a communication channel. In one embodiment, the server 301 can be a computer having one or more Central Processing Units (CPUs) to which vehicles, such as the autonomous vehicle 303, may be connected using a computer network. For example, in some implementations, the communication channel between the server 301 and the communication interface 305 includes a computer network, such as a local area network, a wireless local area network, a cellular communications network, or a broadband high-speed always-connected wireless communication connection (e.g., a current or future generation of mobile network link).

At least some embodiments of the systems and methods disclosed herein can be implemented using computer instructions executed by the controller 307, such as the firmware 304. In some instances, hardware circuits can be used to implement at least some of the functions of the firmware 304. The firmware 304 can be initially stored in non-volatile storage media, such as by using memory 309, or another non-volatile device, and loaded into the volatile DRAM 311 and/or the in-processor cache memory for execution by the controller 307. In one example, the firmware 104 can be configured to use the techniques discussed herein for controlling display or other devices of a vehicle as configured based on collected user data.

Figure 8:
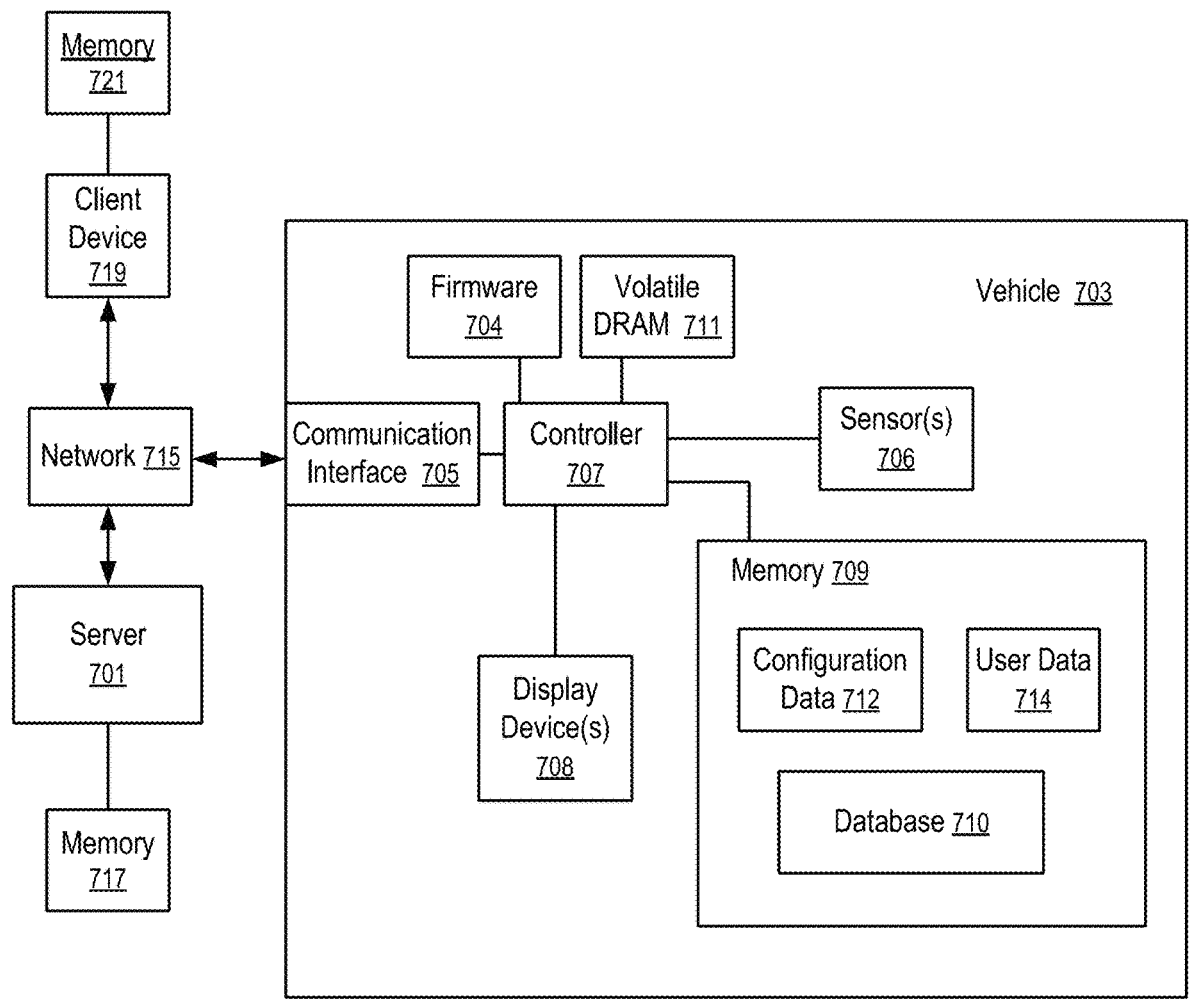
FIG. 8 shows a vehicle configured via a communication interface using a cloud service, according to one embodiment.

FIG. 8 shows a vehicle 703 configured (e.g., to control navigation) via a communication interface using a cloud service, according to one embodiment. For example, vehicle 703 is configured in response to analysis of object data (e.g., received from other vehicle 111) by server 701.

The vehicle 703 includes a communication interface 705 used to receive a navigation control and/or configuration update, each of which may be based on analysis of collected object data. For example, the update can be received from server 701 and/or client device 719. Communication amongst two or more of the vehicle 703, a server 701, and a client device 719 can be performed over a network 715 (e.g., a wireless network). This communication is performed using communication interface 705.

In one embodiment, the server 701 controls the loading of configuration data (e.g., based on analysis of received object data) of the new configuration into the memory 709 of the vehicle. In one embodiment, data associated with usage of vehicle 703 is stored in a memory 721 of client device 719.

A controller 707 controls one or more operations of the vehicle 703. For example, controller 707 controls user data 714 stored in memory 709. Controller 707 also controls loading of updated configuration data into memory 709 and/or other memory of the vehicle 703. Controller 707 also controls display of information on display device(s) 708. Sensor(s) 706 provide data regarding operation of the vehicle 703. At least a portion of this operational data can be communicated to the server 701 and/or the client device 719.

Memory 709 can further include, for example, configuration data 712 and/or database 710. Configuration data 712 can be, for example, data associated with operation of the vehicle 703 as provided by the server 701. The configuration data 712 can be, for example, based on collected and/or analyzed object data.

Database 710 can store, for example, configuration data for a user and/or data collected by sensors 706. Database 710 also can store, for example, navigational maps and/or other data provided by the server 701.

In one embodiment, when a vehicle is being operated, data regarding object detection activity of vehicle 703 can be communicated to server 701. This activity may include navigational and/or other operational aspects of the vehicle 703.

As illustrated in FIG. 8, controller 707 also may control the display of images on one or more display devices 708 (e.g., an alert to the user can be displayed in response to determining by server 701 and/or controller 707 that vehicle 703 is failing to properly detect objects). Display device 708 can be a liquid crystal display. The controller 707 may receive data collected by one or more sensors 706. The sensors 706 may be, for example, mounted in the vehicle 703. The sensors 706 may include, for example, a camera, a microphone, a motion detector, and/or a camera.

The sensors 706 may provide various types of data for collection and/or analysis by the controller 707. For example, the collected data may include image data from the camera and/or audio data from the microphone. In one embodiment, the image data includes images of one or more new objects encountered by vehicle 703 during travel.

In one embodiment, the controller 707 analyzes the collected data from the sensors 706. The analysis of the collected data includes providing some or all of the object data to server 701.

In one embodiment, memory 709 stores database 710, which may include data collected by sensors 706 and/or configuration data received by communication interface 705 from a computing device, such as, for example, server 701. For example, this communication may be used to wirelessly transmit collected data from the sensors 706 to the server 701. The data received by the vehicle may include configuration or other data used to configure control of navigation, display, or other devices by controller 707.

In FIG. 8, firmware 704 controls, for example, the operations of the controller 707. The controller 707 also can, for example, run the firmware 704 to perform operations responsive to communications from the server 701.

The vehicle 703 includes volatile Dynamic Random-Access Memory (DRAM) 711 for the storage of run-time data and instructions used by the controller 707 to improve the computation performance of the controller 707 and/or provide buffers for data transferred between the server 701 and memory 709. DRAM 711 is volatile.

Figure 9:
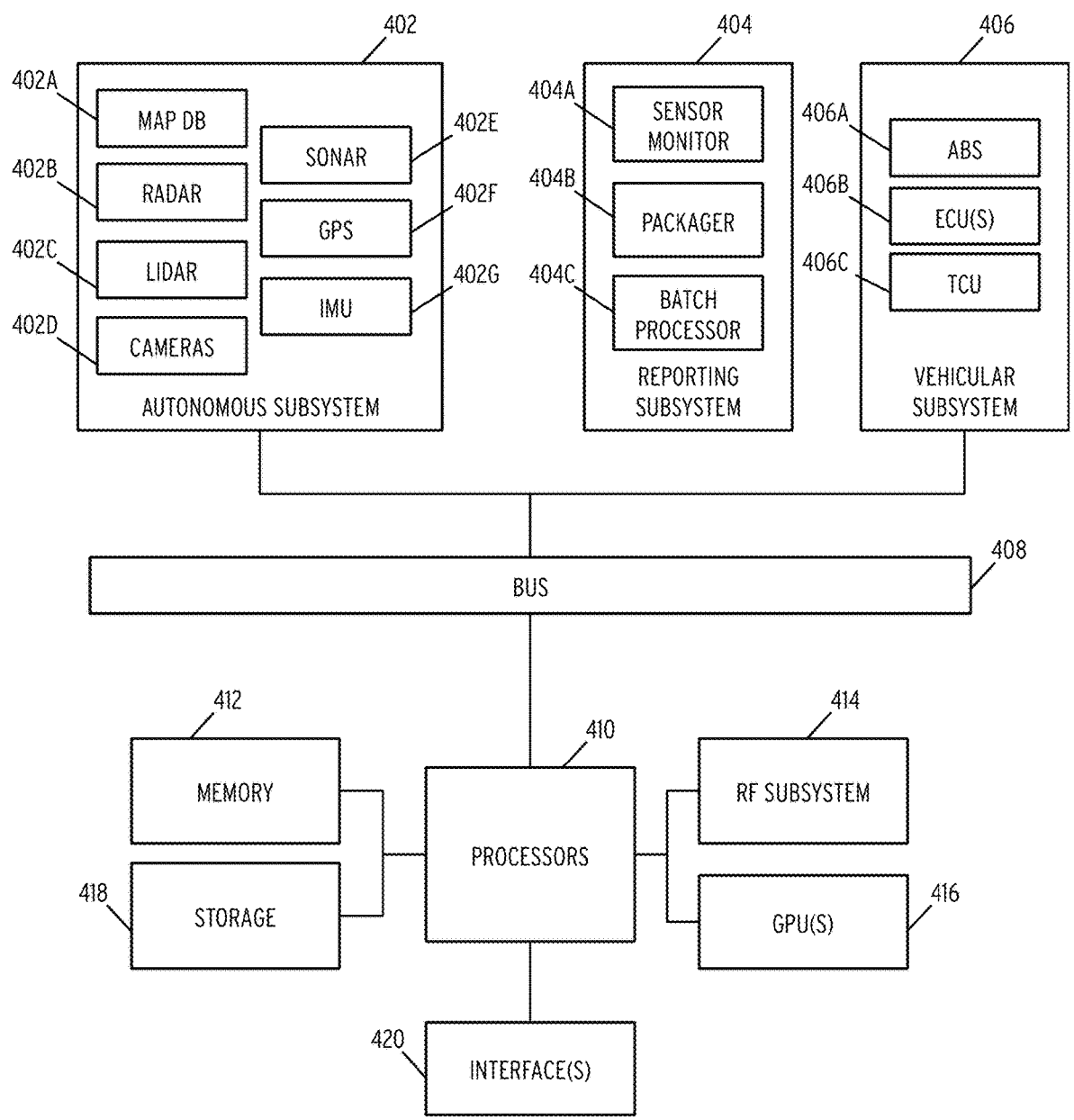
FIG. 9 is a block diagram of an autonomous vehicle including one or more various components and/or subsystems, each of which can be updated in various embodiments to configure the vehicle and/or perform other actions associated with the vehicle.

FIG. 9 is a block diagram of an autonomous vehicle (e.g., current vehicle 113) including one or more various components and/or subsystems, each of which can be updated in various embodiments to control navigation based at least in part on received object data, configure the vehicle, and/or perform other actions associated with the vehicle. The system illustrated in FIG. 9 may be installed entirely within a vehicle.

The system includes an autonomous vehicle subsystem 402. In the illustrated embodiment, autonomous vehicle subsystem 402 includes map database 402A, radar devices 402B, Lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, Lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various antilock braking systems 406A, engine control units 402B, and transmission control units 402C. These components may be utilized to control the operation of the autonomous vehicle in response to the streaming data generated by autonomous vehicle subsystem 402A. The standard autonomous vehicle interactions between autonomous vehicle subsystem 402 and vehicular subsystem 406 are generally known in the art and are not described in detail herein.

The processing side of the system includes one or more processors 410, short-term memory 412, an RF system 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one more high throughput GPU devices for processing data received from autonomous vehicle subsystem 402A. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 10). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. In one embodiment, the bus 408 may comprise a controller area network (CAN) bus. In some embodiments, other bus types may be used (e.g., a FlexRay or MOST bus). Additionally, each subsystem may include one or more additional buses to handle internal subsystem communications (e.g., LIN buses for lower bandwidth communications).

Figure 10:
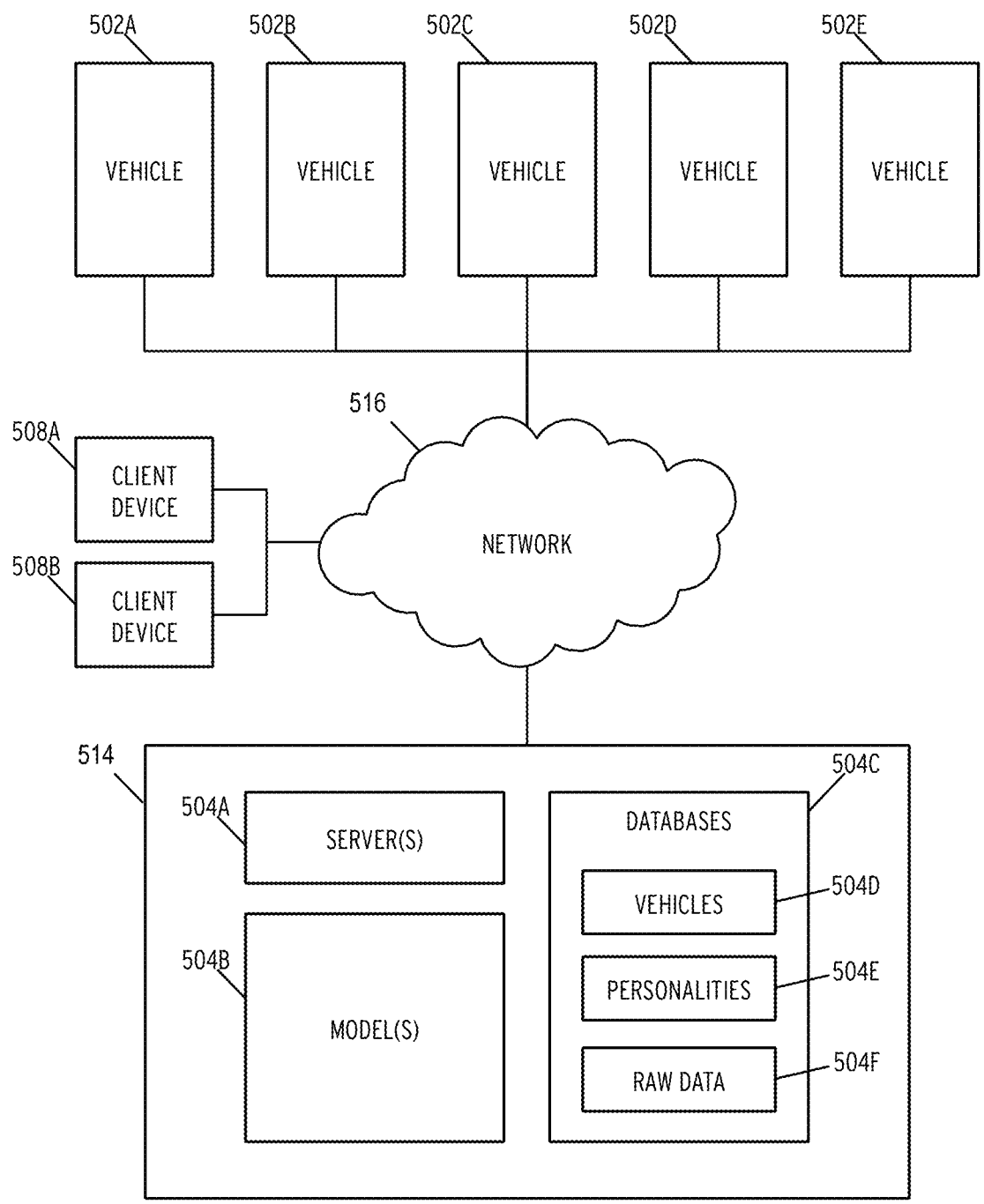
FIG. 10 is a block diagram of a centralized autonomous vehicle operations system, according to various embodiments.

FIG. 10 is a block diagram of a centralized autonomous vehicle operations system, according to various embodiments. As illustrated, the system includes a number of autonomous vehicles 502A-502E. In one embodiment, each autonomous vehicle may comprise an autonomous vehicle such as that depicted in FIG. 9. Each autonomous vehicle 502A-502E may communicate with a central system 514 via a network 516. In one embodiment, network 516 comprises a global network such as the Internet.

In one example, central system 514 is implemented using one or more of servers 101, 301, and/or 701. In one example, one or more of autonomous vehicles 502A-502E are autonomous vehicle 703.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models.

Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

The present disclosure includes methods and apparatuses which perform these methods, including data processing systems which perform these methods, and computer readable media containing instructions which when executed on data processing systems cause the systems to perform these methods.

Each of the server 101 and the computer 131 of a vehicle 111, . . . , or 113 can be implemented as one or more data processing systems. A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving, by at least one processor, object data regarding a first object detected by at least one sensor of a first vehicle;
   generating, by the at least one processor and based on the object data, navigation data;
   determining, by the at least one processor based on comparing a first location of the first vehicle to a second location of a second vehicle, that the first vehicle is within a predetermined distance from the second vehicle; and
   in response to determining that the first vehicle is within the predetermined distance, sending the navigation data to the second vehicle the navigation data for use by a controller of the second vehicle to control navigation.

2. The method of claim 1, wherein the first object is beyond a detection range of the second vehicle when the first vehicle sends the object data to the second vehicle.

3. The method of claim 1, wherein the first object is greater than the predetermined distance from the second vehicle when the object data is received from the first vehicle.

4. The method of claim 1, wherein the first object is a traffic sign, a traffic light, a road lane, or a physical structure.

5. The method of claim 1, wherein the navigation data includes at least a portion of the object data.

6. The method of claim 1, further comprising receiving object data regarding a second object detected by at least one sensor of a third vehicle, wherein the navigation data includes the object data regarding the second object.

7. The method of claim 1, wherein the navigation data is sent to the second vehicle in response to determining that the first vehicle is within the predetermined distance.

8. The method of claim 1, wherein the object data is transmitted to the second vehicle by the first vehicle in response to a determination that the first vehicle is within a predetermined distance of the second vehicle.

9. A system, comprising:
   a communication device configured on a second vehicle;
   at least one processor connected to the communication device; and
   memory storing instructions configured to instruct the at least one processor to:
      determine that a first vehicle is within a predetermined proximity of the second vehicle;
      receive, via the communication device from the first vehicle, object data regarding objects encountered by the first vehicle during travel, wherein the object data is collected by at least one sensor of the first vehicle; and
      generate, based on the received object data, a navigation path for the second vehicle to control navigation of the second vehicle based on the navigation path.

10. The system of claim 9, wherein the predetermined proximity is a distance from a location of the first vehicle to the location of the second vehicle.

11. The system of claim 9, wherein determining that the first vehicle is within the predetermined proximity of the location of the second vehicle comprises:
    determining a location of the first vehicle; and
    comparing the location of the first vehicle to the location of the second vehicle.

12. The system of claim 9, wherein determining that the first vehicle is within the predetermined proximity of the location of the second vehicle comprises:
    determining a first time that the object data was collected by the at least one sensor of the first vehicle when the first vehicle was at a first location;
    determining a second time that the second vehicle is expected to be at the first location; and
    determining that a time difference between the first time and the second time is within a predetermined tolerance.

13. The system of claim 9, wherein receiving the object data regarding objects encountered by the first vehicle is performed after determining that the first vehicle is within the predetermined proximity of the location of the second vehicle.

14. The system of claim 10, wherein the object data is received by a communication device of the second vehicle while the second vehicle is within a wireless communication range of the first vehicle.

15. The system of claim 9, wherein the received object data includes a first object, and the first object is outside of a detection range of the second vehicle at a time the object data is received.

16. A non-transitory computer storage medium storing instructions which, when executed on a server, cause the server to perform a method comprising:
    receiving, by the server from a transmitter of a first vehicle, object data regarding at least one object, wherein the object data is based on data collected by at least one sensor of the first vehicle;
    determining that a second vehicle is within a predetermined distance of a location of the first vehicle; and
    in response to determining that the second vehicle is within the predetermined distance, controlling navigation of the second vehicle based on the object data.

17. The non-transitory computer storage medium of claim 16, wherein the object data comprises data obtained from an artificial neural network model of the first vehicle.

18. The non-transitory computer storage medium of claim 16, wherein the server is configured to monitor an operating status for each of a plurality of vehicles, and the plurality of vehicles includes at least one of the first vehicle or the second vehicle.

19. The non-transitory computer storage medium of claim 16, wherein controlling navigation of the second vehicle is performed in response to a determination that:
    the second vehicle is within a predetermined distance of a prior location of the first vehicle at which the first vehicle collected data regarding surrounding objects; or
    the second vehicle is within a predetermined distance of a present location of the first vehicle.

* * * * *